US009151217B2

(12) United States Patent
Hilditch et al.

(10) Patent No.: US 9,151,217 B2
(45) Date of Patent: Oct. 6, 2015

(54) TWIN TURBOCHARGER WASTEGATE CONTROL

(71) Applicant: Ford Global Technologies, LLC, Dearborn, MI (US)

(72) Inventors: James Alfred Hilditch, Canton, MI (US); Julia Helen Buckland, Commerce Township, MI (US); Robert Andrew Wade, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 163 days.

(21) Appl. No.: 13/725,438

(22) Filed: Dec. 21, 2012

(65) Prior Publication Data

US 2014/0174074 A1    Jun. 26, 2014

(51) Int. Cl.
| | | |
|---|---|---|
| *F02D 23/00* | (2006.01) | |
| *F02B 33/44* | (2006.01) | |
| *F02B 33/00* | (2006.01) | |
| *F16K 31/02* | (2006.01) | |
| *F02B 37/12* | (2006.01) | |
| *F02B 37/007* | (2006.01) | |
| *F02B 37/18* | (2006.01) | |
| *F02D 41/00* | (2006.01) | |

(52) U.S. Cl.
CPC .............. *F02B 37/12* (2013.01); *F02B 37/007* (2013.01); *F02B 37/18* (2013.01); *F02D 41/0007* (2013.01); *F02D 41/0082* (2013.01); *F02D 41/0085* (2013.01); *Y02T 10/144* (2013.01)

(58) Field of Classification Search
CPC ........ F02B 37/12; F02B 37/007; F02B 37/18; F02D 41/0007
USPC .......................................................... 361/60
See application file for complete search history.

(56) References Cited

U.S. PATENT DOCUMENTS

| | | | | |
|---|---|---|---|---|
| 4,490,622 A | | 12/1984 | Osborn | |
| 4,656,400 A | * | 4/1987 | Pailthorp et al. | .............. 318/135 |
| 4,958,497 A | * | 9/1990 | Kawamura | ...................... 60/608 |
| 5,090,204 A | * | 2/1992 | Bonitz et al. | .................... 60/612 |
| 5,845,495 A | * | 12/1998 | Schray et al. | ................... 60/612 |
| 6,050,250 A | * | 4/2000 | Kerkau | .......................... 123/688 |

(Continued)

FOREIGN PATENT DOCUMENTS

| | | | | |
|---|---|---|---|---|
| DE | 2809202 A | * | 9/1979 | |
| FR | 2885649 A1 | * | 11/2006 | |

OTHER PUBLICATIONS

Karnik, Amey Y. et al., "Exhaust Pressure Estimation from Wastegate Motor Current," U.S. Appl. No. 13/725,250, filed Dec. 21, 2012, 28 pages.

*Primary Examiner* — Thai Ba Trieu
*Assistant Examiner* — Jessica Kebea
(74) *Attorney, Agent, or Firm* — Julia Voutyras; Alleman Hall McCoy Russell & Tuttle LLP (57) ABSTRACT

An engine system comprises a first turbocharger including a first wastegate, first wastegate actuator, and first turbocharger sensor, a second turbocharger including a second wastegate, second wastegate actuator, and second turbocharger sensor, and a controller configured to adjust the first wastegate actuator so that a parameter of the first turbocharger matches a parameter of the second turbocharger, based on output from the first and second turbocharger sensors. In this way, turbocharger output between the two turbochargers may be balanced.

18 Claims, 3 Drawing Sheets

(56) References Cited

U.S. PATENT DOCUMENTS

| | | | |
|---|---|---|---|
| 6,357,234 B1* | 3/2002 | Gladden | 60/612 |
| 6,687,601 B2* | 2/2004 | Bale et al. | 701/108 |
| 7,076,955 B2* | 7/2006 | Herz et al. | 60/612 |
| 7,770,393 B2 | 8/2010 | Buckland et al. | |
| 7,926,270 B2 | 4/2011 | Weaver et al. | |
| 8,001,782 B2* | 8/2011 | Pursifull | 60/612 |
| 8,082,091 B2* | 12/2011 | Youssef et al. | 701/102 |
| 8,180,553 B2* | 5/2012 | Buckland et al. | 701/103 |
| 8,271,182 B2* | 9/2012 | Storhok et al. | 701/105 |
| 8,359,859 B2* | 1/2013 | Shiraishi | 60/612 |
| 2005/0092949 A1* | 5/2005 | Wilhelm et al. | 251/129.04 |
| 2005/0166593 A1* | 8/2005 | Takahashi et al. | 60/612 |
| 2005/0188696 A1* | 9/2005 | Herz et al. | 60/612 |
| 2006/0117751 A1* | 6/2006 | Todoroki et al. | 60/612 |
| 2006/0260306 A1* | 11/2006 | Henn et al. | 60/600 |
| 2009/0013945 A1 | 1/2009 | Buckland et al. | |
| 2009/0018751 A1* | 1/2009 | Buckland et al. | 701/103 |
| 2009/0077965 A1* | 3/2009 | Pursifull | 60/602 |
| 2009/0094009 A1* | 4/2009 | Muller | 703/7 |
| 2009/0107140 A1* | 4/2009 | Pursifull | 60/600 |
| 2009/0183507 A1 | 7/2009 | Weaver et al. | |
| 2010/0175375 A1* | 7/2010 | Gilch et al. | 60/602 |
| 2011/0023481 A1* | 2/2011 | Baeuerle | 60/602 |
| 2011/0041493 A1* | 2/2011 | Doering et al. | 60/603 |
| 2011/0192160 A1* | 8/2011 | Takahashi et al. | 60/600 |
| 2011/0296831 A1* | 12/2011 | Pursifull | 60/602 |

* cited by examiner

TWIN TURBOCHARGER WASTEGATE CONTROL

FIELD

The present disclosure relates to an internal combustion engine.

BACKGROUND AND SUMMARY

Turbochargers for internal combustion engines can include a wastegate for controlling the portion of the exhaust stream that is directed through the exhaust gas turbine stage of the turbocharger. By varying the position of the wastegate, the level of boost provided by the compressor stage of the turbocharger can be increased or decreased accordingly. Engines including twin turbochargers, such as V-engines, can utilize wastegate control to balance the level of boost provided by each of the turbochargers. Typically, for twin turbocharged engines, it is assumed that the system is symmetric, and as such each wastegate is concurrently commanded to the same position.

However, the inventors herein have recognized that most V-engine systems are not completely symmetric. Asymmetries present in V-engine systems may include differences in exhaust system routing, exhaust manifold design, turbine housing casting design, and/or wastegate passage design between the banks of the engine. Additionally, manufacturing variability may introduce asymmetry into the wastegate passages or spring system used to oppose the pneumatic force in pneumatically-actuated wastegates. Further, hysteresis within the actuators may cause asymmetry, where small movements may result in each actuator being at opposite ends of the hysteresis band.

Thus, even if the wastegates are commanded to the same position, imbalance between the turbochargers may still result due to the asymmetry present in the system. This may result in the turbochargers operating in different operating states, such as operating with different turbine power, turbine shaft speed, and for pneumatic actuators, different wastegate position. Under some engine operating conditions, it may be desirable to operate near the turbine shaft speed limit. However, in an asymmetric system, the fastest rotating turbine will limit the performance of the system, and depending on the magnitude of the asymmetry, the capability of the system may be greatly reduced.

Accordingly, an engine system is provided which may allow for detection and balancing of asymmetries present in a V-engine with two turbochargers. The engine system comprises a first turbocharger including a first wastegate, first wastegate actuator, and first turbocharger sensor, a second turbocharger including a second wastegate, second wastegate actuator, and second turbocharger sensor, and a controller configured to adjust the first wastegate actuator so that a parameter of the first turbocharger matches a parameter of the second turbocharger, based on output from the first and second turbocharger sensors.

In this way, output from turbocharger sensors may be used to detect if a turbocharger parameter, such as turbine speed or power, is out of balance between the two turbochargers. If the turbochargers are out of balance, the wastegate of at least the first turbocharger may be adjusted until the turbocharger parameters are brought into alignment. In this way, small variations in the amount of boost provided by each turbocharger may be balanced. Further, engine performance may be increased by detecting if a turbocharger is operating at a speed or power output lower than desired, and adjusting the wastegate of that turbocharger to increase the turbocharger performance.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
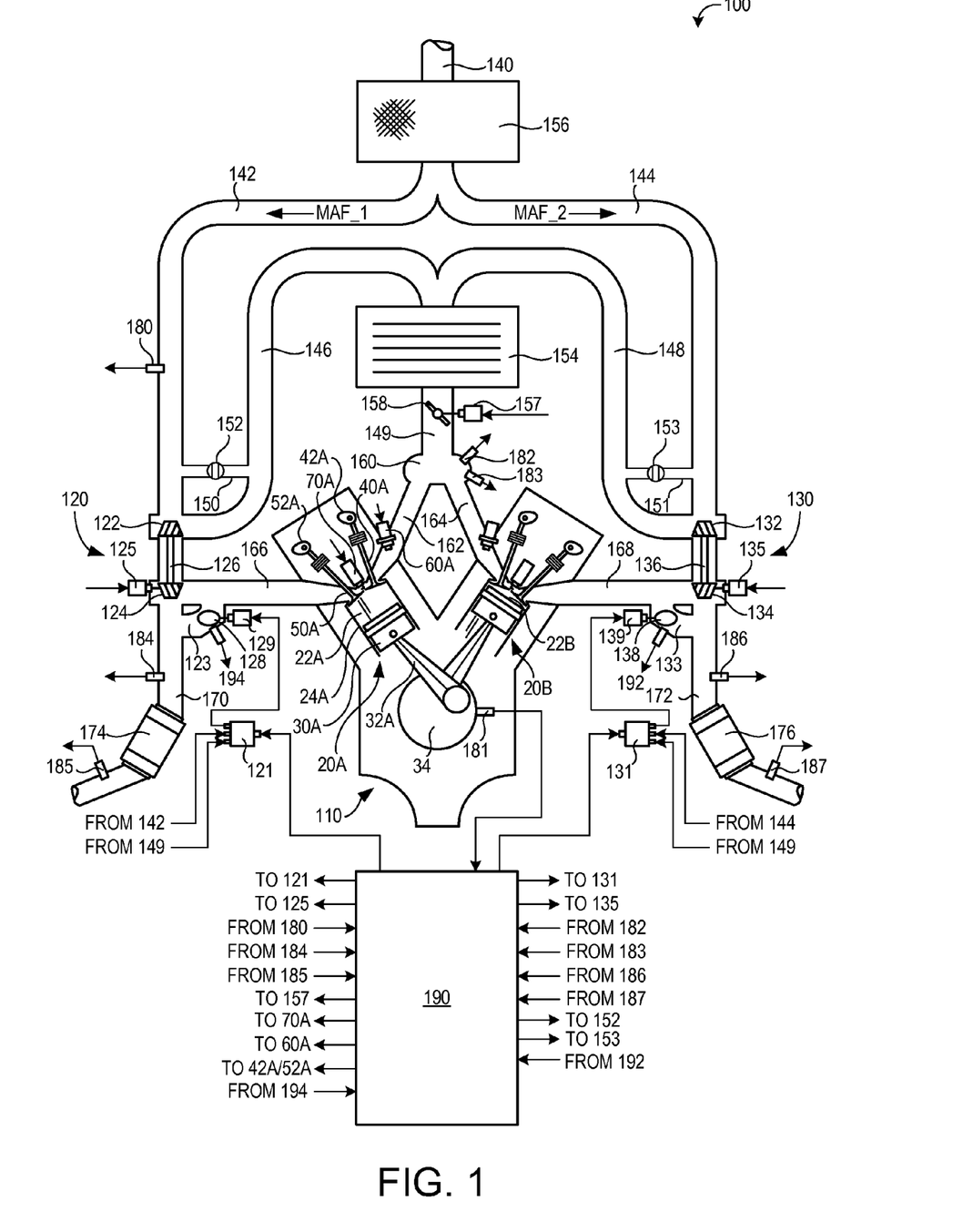
FIG. 1 shows a schematic depiction of an example engine system.
Figure 2:
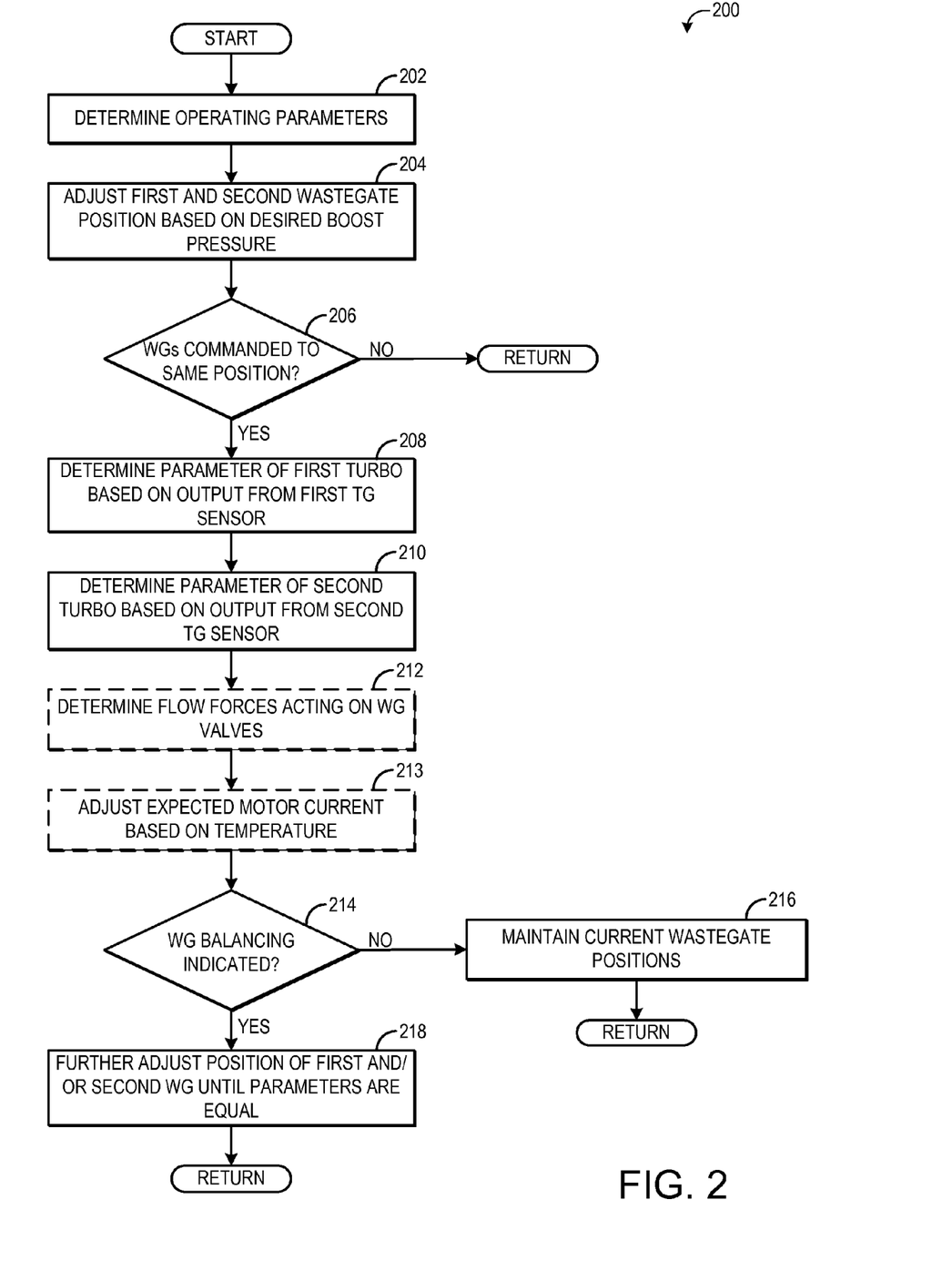
FIG. 2 shows a flow chart illustrating a method for balancing turbochargers according to an embodiment of the present disclosure.
Figure 3:
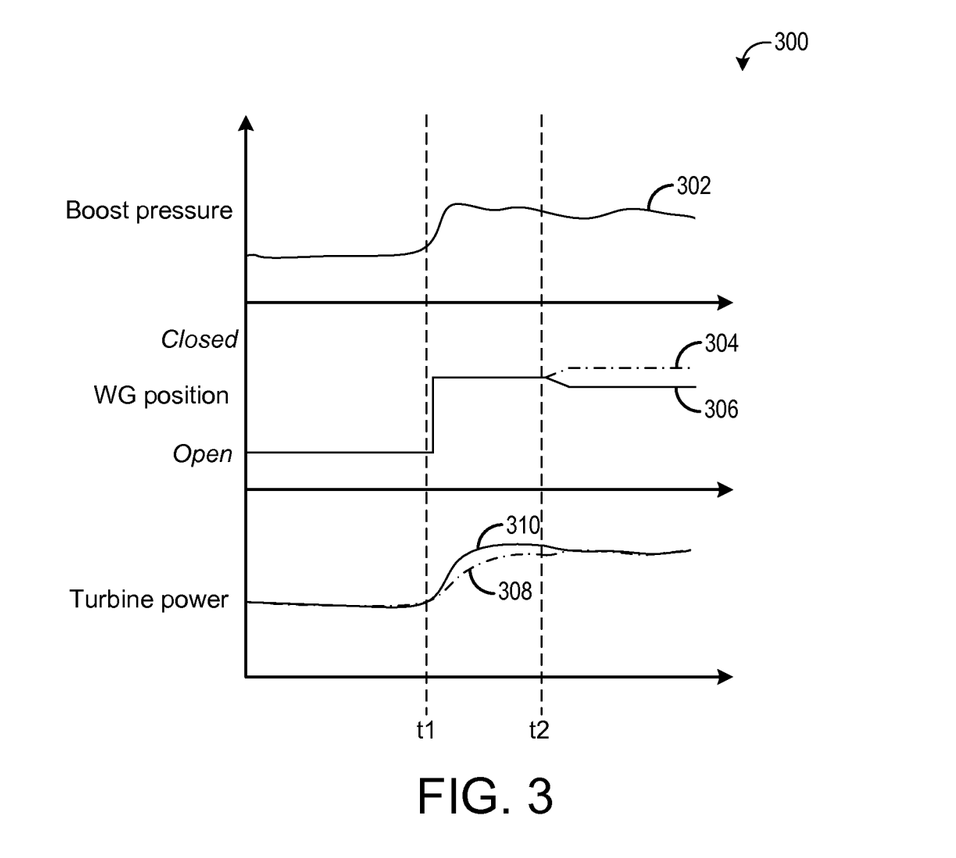
FIG. 3 is a diagram illustrating example operating parameters of interest.

As explained above, asymmetries may be present between the banks of a V-engine. These asymmetries may result in unbalanced turbocharger performance, even if the wastegates of each turbocharger are commanded to the same position. In order to balance uneven turbochargers, each turbocharger may be provided with a sensor, such as a turbine speed sensor or wastegate position or actuator motor current sensor. The output from the turbocharger sensors may be used to calculate a parameter of turbocharger performance, such as turbine power or turbine speed. If the turbine speed or power between the two turbochargers does not match, the wastegates of the turbochargers may be adjusted until the respective parameters are balanced. FIG. 1 shows an engine including two turbochargers, wastegates, and turbocharger sensors. FIG. 1 also includes a control system, which may carry out the method illustrated in FIG. 2. Example operating parameters observed during the execution of the method of FIG. 2 are illustrated in FIG. 3.

FIG. 1 shows a schematic depiction of an example engine system 100 including a multi-cylinder internal combustion engine 110 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156. At least a portion of the intake air (MAF_1) can be directed to a compressor 122 of turbocharger 120 via a first branch of the intake passage 140 as indicated at 142 and at least a portion of the intake air (MAF_2) can be directed to a compressor 132 of turbocharger 130 via a second branch of the intake passage 140 as indicated at 144.

The first portion of the total intake air (MAF_1) can be compressed via compressor 122 where it may be supplied to intake manifold 160 via intake air passage 146. Thus, intake passages 142 and 146 form a first branch of the engine's air intake system. Similarly, a second portion of the total intake air (MAF_2) can be compressed via compressor 132 where it may be supplied to intake manifold 160 via intake air passage 148. Thus, intake passages 144 and 148 form a second branch of the engine's air intake system. As shown in FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 and/or an intake manifold temperature sensor 183, each communicating with control system 190. Intake passage 149 can include an air cooler 154 and/or a throttle 158. The position of the throttle can be adjusted by the control system via a throttle actuator 157 communicatively coupled to control system 190. As shown in FIG. 1, a first compressor recirculation valve (CRV1) 152 and a second compressor recirculation valve (CRV2) 153 may be provided to selectively recirculate intake air around the compressor stages of turbochargers 120 and 130 via recirculation passages 150, 151.

Engine 110 may include a plurality of cylinders two of which are shown in FIG. 1 as 20A and 20B. Note that in some examples, engine 110 can include more than two cylinders such as 3, 4, 5, 6, 8, 10 or more cylinders. These various cylinders can be equally divided and arranged in a vee configuration in-line with one of cylinders 20A and 20B. Cylinders 20A and 20B among other cylinders of the engine may be identical in some examples and include identical components. As such, only cylinder 20A will be described in detail. Cylinder 20A includes a combustion chamber 22A defined by combustion chamber walls 24A. A piston 30A is disposed within combustion chamber 22A and is coupled to a crank shaft 34 via a crank arm 32A. Crank shaft 34 may include an engine speed sensor 181 that can identify the rotational speed of crank shaft 34. Engine speed sensor 181 can communicate with control system 190 to enable a determination of engine speed. Cylinder 20A can include a spark plug 70A for delivering an ignition spark to combustion chamber 22A. However, in some examples, spark plug 70A may be omitted, for example, where engine 110 is configured to provide combustion via compression ignition. Combustion chamber 22A may include a fuel injector 60A, which in this example is configured as a port based fuel injector. However, in other examples, fuel injector 60A can be configured as a direct in-cylinder injector.

Cylinder 20A can further include at least one intake valve 40A actuated via an intake valve actuator 42A and at least one exhaust valve 50A actuated via an exhaust valve actuator 52A. Cylinder 20A can include two or more intake valves and/or two or more exhaust valves along with associated valve actuators. In this particular example, actuators 42A and 52A are configured as cam actuators, however, in other examples, electromagnetic valve actuators (EVA) may be utilized. Intake valve actuator 42A can be operated to open and close intake valve 40A to admit intake air into combustion chamber 22A via intake passage 162 communicating with intake manifold 160. Similarly, exhaust valve actuator 52A can be operated to open and close exhaust valve 50A to exhaust products of combustion from combustion chamber 22A into exhaust passage 166. In this way, intake air may be supplied to combustion chamber 22A via intake passage 162 and products of combustion may be exhausted from combustion chamber 22A via exhaust passage 166.

It should be appreciated that cylinder 20B or other cylinders of engine 110 can include the same or similar components of cylinder 20A as described above. Thus, intake air may be supplied to combustion chamber 22B via intake passage 164 and products of combustion may be exhausted from combustion chamber 22B via exhaust passage 168. Note that in some examples a first bank of cylinders of engine 110 including cylinder 20A as well as other cylinders can exhaust products of combustion via a common exhaust passage 166 and a second bank of cylinders including cylinder 20B as well as other cylinders can exhaust products of combustion via a common exhaust passage 168.

Products of combustion that are exhausted by engine 110 via exhaust passage 166 can be directed through exhaust turbine 124 of turbocharger 120, which in turn can provide mechanical work to compressor 122 via shaft 126 in order to provide compression to intake air as described above. Alternatively, some or all of the exhaust gases flowing through exhaust passage 166 can bypass turbine 124 via turbine bypass passage 123 as controlled by wastegate 128. The position of wastegate 128 may be controlled by actuator 129 as directed by control system 190. As one non-limiting example, control system 190 can adjust the position of actuator 129 via a solenoid valve 121. In this particular example, solenoid valve 121 modulates pressure between that of the air in intake passage 142 arranged upstream of compressor 122 and that of the air in intake passage 149 arranged downstream of compressor 122. As indicated by FIG. 1, control system 190 communicates with actuator 129 via solenoid valve 121. However, it should be appreciated in other examples other suitable approaches for actuating wastegate 128 may be used. For example, actuator 129 may be electrically actuated by a motor.

A sensor 194 may be positioned on or near turbocharger 120. In one example, sensor 194 may detect turbine speed. In another example, sensor 194 may detect a position of wastegate 128. For example, one or more of a wastegate rod, linkage, or valve position may be detected by sensor 194. In a still further example, sensor 194 may detect one or more attributes of actuator 129. Sensor 194 may measure wastegate position by measuring output from the motor of actuator 129, for example, if actuator 129 is an electronic actuator, or may measure current from the electronic actuator motor. Output from sensor 194 may be used to calculate turbine speed or turbine power, as explained below.

Similarly, products of combustion that are exhausted by engine 110 via exhaust passage 168 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 168 can bypass turbine 134 via turbine bypass passage 133 as controlled by wastegate 138. The position of wastegate 138 may be controlled by actuator 139 as directed by control system 190. The position of wastegate 138 may be controlled by actuator 139 as directed by control system 190. As one non-limiting example, control system 190 can adjust the position of actuator 139 via a solenoid valve 131. In this particular example, solenoid valve 131 modulates pressure between that of the air in intake passage 144 arranged upstream of compressor 132 and that of the air in intake passage 149 arranged downstream of compressor 132. As indicated by FIG. 1, control system 190 communicates with actuator 139 via solenoid valve 131. However, it should be appreciated that in other examples other suitable approaches for actuating wastegate 138 may be used, such as an electrically-actuated wastegate.

A sensor 192 may be positioned on or near turbocharger 130. In one example, sensor 192 may detect turbine speed. In another example, sensor 192 may detect a position of wastegate 138. For example, one or more of a wastegate rod, linkage, or valve position may be detected by sensor 192. In a still further example, sensor 192 may detect one or more attributes of actuator 139. Sensor 192 may measure wastegate position by measuring output from the motor of actuator 139, for example, if actuator 139 is an electronic actuator, or may measure current from the electronic actuator motor. Output from sensor 192 may be used to calculate turbine speed or turbine power, as explained below.

In some examples, exhaust turbines 124 and 134 may be configured as variable geometry turbines, whereby associated actuators 125 and 135 may be used to adjust the position of the turbine impeller blades to vary the level of energy that is obtained from the exhaust gas flow and imparted to their respective compressor. For example, the control system can be configured to independently vary the geometry of the exhaust gas turbines 124 and 134 via their respective actuators 125 and 135. As explained previously, the turbochargers 120 and 130 may become imbalanced, e.g., operate at different turbine speeds or with different turbine power. In order to balance the turbochargers, the actuators 125 and 135 may be adjusted. For example, the speed of each turbocharger may be determined using turbocharger speed sensors, and if the speeds do not match, one or more of actuator 125 and actuator 135 may be adjusted until the speeds of the turbochargers match. In another example, a parameter of each of the actuators 125, 135, such as the position, force, etc., may be determined, and if the parameters are unequal, the actuators may be adjusted.

Products of combustion exhaust by one or more cylinders via exhaust passage 166 can be directed to ambient via exhaust passage 170. Exhaust passage 170 may include an exhaust aftertreatment device such as catalyst 174, and one or more exhaust gas sensors indicated at 184 and 185, for example. Similarly, products of combustion exhaust by one or more cylinders via exhaust passage 168 can be directed to ambient via exhaust passage 172. Exhaust passage 172 may include an exhaust aftertreatment device such as catalyst 176, and one or more exhaust gas sensors indicated at 186 and 187, for example. Exhaust gas sensors 184, 185, 186, and/or 187 can communicate with control system 190.

Engine system 100 can include various other sensors. For example, at least one of intake passages 142 and 144 can include a mass air flow sensor 180. In some examples, only one of intake passages 142 and 144 can include a mass air flow sensor. In still other examples, both of intake passages 142 and 144 can include a mass airflow sensor. A mass airflow sensor may include, as one example, a hot wire anemometer or other suitable device for measuring mass flow rate of the intake air. Mass airflow sensor 180 can communicate with control system 190 as shown in FIG. 1.

Control system 190 can include one or more controllers configured to communicate with the various sensors and actuators described herein. As one example, control system 190 can include at least one electronic controller comprising one or more of the following: an input/output interface for sending and receive electronic signals with the various sensors and actuators, a central processing unit, memory such as random accessible memory (RAM), read-only memory (ROM), keep alive memory (KAM), each of which can communicate via a data bus. Control system 190 may include a proportional-integral-derivative (PID) controller in some examples. However, it should be appreciated that other suitable controllers may be used as can be appreciated by one skilled in the art in light of the present disclosure. The controller may store instructions that may be executed in order to carry one or more control routines, such as the control routine described herein with respect to FIG. 2.

Control system 190 can be configured to vary one or more operating parameters of the engine on an individual cylinder basis. For example, the control system can adjust valve timing by utilizing a variable cam timing (VCT) actuator, spark timing by varying the time at which the spark signal is provided to the spark plug, and/or fuel injection timing and amount by varying the pulse width of the fuel injection signal that is provided to the fuel injector by the control system. Thus, at least the spark timing, valve timing, and fuel injection timing can be actuated by the control system.

Thus, the system of FIG. 1 provides for an engine system comprising a first turbocharger including a first wastegate, first wastegate actuator, and first turbocharger sensor; a second turbocharger including a second wastegate, second wastegate actuator, and second turbocharger sensor; and a controller configured to adjust the first wastegate actuator until a parameter of the first turbocharger is equal to a parameter of the second turbocharger, based on output from the first and second turbocharger sensors.

In one example, the first turbocharger sensor and second turbocharger sensor may each comprise turbine speed sensors. The controller may be further configured to calculate a speed of the first turbocharger and a speed of the second turbocharger based on the output from the first and second turbine speed sensors. The controller may be configured to adjust the first wastegate actuator until a speed of the first turbine matches a speed of the second turbine.

In an example, the first turbocharger sensor and second turbocharger sensor may each comprise a wastegate position sensor. Each wastegate position sensor measures one or more of a wastegate rod, linkage, and valve to measure wastegate position. The controller may be configured to adjust the first wastegate actuator until a position of the first wastegate matches a position of the second wastegate.

In another example, the first turbocharger sensor and second turbocharger sensor may each comprise a wastegate actuator motor current sensor. The controller may be further configured to calculate a pressure ratio of a first turbine of the first turbocharger and a pressure ratio of a second turbine of the second turbocharger based on the output from the first and second wastegate actuator motor current sensors. The controller may be configured to calculate turbine power of the first turbocharger based on the calculated pressure ratio of the first turbine and calculate turbine power of the second turbocharger based on the calculated pressure ratio of the second turbine. The controller may be further configured to adjust the first wastegate actuator and the second wastegate actuator until the turbine power of the first turbocharger matches the turbine power of the second turbocharger.

The system may include an engine having a first cylinder group and a second cylinder group, and the first turbocharger may be configured to receive exhaust from the first cylinder group and the second turbocharger may be configured to receive exhaust from the second cylinder group.

Turning now to FIG. 2, a method 200 for balancing twin turbochargers based on feedback from wastegate sensors is illustrated. Method 200 may be carried out by a controller, such as a controller of control system 190, according to instructions stored thereon. Method 200 may adjust wastegate actuators of twin turbochargers installed in a V-engine or other dual-engine bank configuration in order to provide equal turbine output from both turbochargers.

At 202, method 200 includes determining engine operating parameters. The engine operating parameters determined at 202 include, but are not limited to, engine speed, engine load, current boost pressure (determined based on feedback from a boost pressure sensor, for example), and wastegate position.

At 204, method 200 includes adjusting a first wastegate position and a second wastegate position based on desired boost pressure.

The first wastegate, such as wastegate 128, may be configured to regulate exhaust flow through a first turbocharger, such as turbocharger 120. The second wastegate, such as wastegate 138, may be configured to regulate exhaust flow through a second turbocharger, such as turbocharger 130. As shown in FIG. 1, the turbochargers may be configured such that compressed intake air routed through each compressor is directed to a common intake air passage and manifold before being split to two separate engine banks. Thus, a single measurement of engine boost pressure may be determined based on manifold pressure. In order to provide a desired level of boost, the wastegates of the turbochargers may be adjusted to control exhaust flow through each turbine, and thus control the level of compression provided by the turbochargers. The desired boost pressure may be a function of engine speed and load, for example.

Because each engine bank is assumed to be symmetric, the same adjustment to each wastegate of the turbochargers may be assumed to affect boost pressure to the same degree. Thus, in most conditions a single wastegate command may be sent to both wastegate actuators, resulting in the wastegates for each turbocharger being in the same position. However, slight asymmetries may exist between the engine banks, resulting in different exhaust flows through the turbines. Further, wastegate hysteresis may result in the wastegates being in different positions. Thus, even if the wastegates are commanded to the same position, the turbine speed and/or power provided by each turbine may be different. Such differences in turbine speed and power may reduce engine output.

In order to maintain the turbochargers at equal operating parameters, the wastegate positions may be adjusted based on feedback from turbocharger sensors, such as wastegate sensors. However, under some conditions, the wastegates may not be commanded to the same position. For example, if the engine is operating under a variable displacement mode with one engine bank undergoing combustion and one engine bank only pumping air (and not combusting fuel), the wastegate positions between the two turbochargers may be commanded to be different. In another example, if degradation of a turbocharger or a wastegate is detected, the engine may operate in a degradation mode where the wastegates are differentially controlled, and thus may be in different positions.

Therefore, before balancing the turbocharger, method 200 judges at 206 if the wastegates have been commanded to the same position. For example, the routine may determine whether the valves are commanded to within a threshold position of each other, such as commanded to positions that are not more than 5% different from one another. If the wastegates are not commanded to the same position, method 200 returns. However, if the wastegates are commanded to the same position, method 200 proceeds to 208 to determine a first parameter of the first turbocharger based on output from a first turbocharger sensor. Similarly, at 210, a second parameter of the second turbocharger is determined based on output from a second turbocharger sensor.

The first and second parameters may be parameters indicative of turbocharger performance. In one example, the first and second parameters may include turbine speed. To measure turbine speed, each turbine may include a speed sensor. In an example, the first and second parameters may be wastegate position. Thus, if the first and second parameters are wastegate position, the output from the first and second turbocharger sensors may include an indication of wastegate position. To determine wastegate position, the position of a wastegate rod or linkage, or the position of the wastegate valve may be determined. Both electrically and pneumatically actuated wastegate positions may be determined based on the wastegate rod or valve position.

In another example, the first and second parameters may include turbine power. Turbine power may describe the power output by the turbine, and in one example may be based on the torque applied to the shaft of the turbocharger and the angular velocity of the shaft. Turbine power may be calculated based on the motor current of an electrically-actuated wastegate. The motor current of the wastegate actuator is proportional to the force used to hold the wastegate in the commanded position. This force is a function of the pressure difference across the turbine. The pressure difference across the turbine along with a measured or estimated pressure at the turbine exit can be used to calculate the turbine pressure ratio. The pressure ratio across the turbine may be used to calculate the torque applied to the shaft by the turbine, and thus the turbine power. However, other mechanisms for calculating the turbine power are possible. Thus, the first and second turbocharger sensors may each measure the motor current of the respective wastegate actuator, and the output from the sensors may be used to determine the turbine power of each turbocharger.

At 212, method 200 optionally includes determining the flow forces acting on each wastegate valve. In one example, the flow forces are determined based on a model. Alternatively, a pressure differential across each wastegate is calculated and used to determine the flow forces. In another example, a lookup table is generated with inputs including wastegate position to determine the flow forces. Such methods may employ the use of one or more sensors or sensor signals disposed in the engine, including mass air flow, manifold air pressure, throttle position, boost pressure, pre-turbine pressure, post-turbine pressure, pre-turbine temperature, post-turbine temperature, and a turbocharger rotational speed signal.

The flow forces acting on each valve may be used to calculate an expected motor current of each wastegate actuator. For example, as described above, the wastegates may be commanded to a position based on desired boost pressure. In order to hold a wastegate in a commanded position, a given amount of force may be applied to the wastegate valve. This force may be a function of the flow forces acting on the wastegate. Thus, given the flow forces acting on the wastegate and the commanded position, the expected motor current of the wastegate actuator may be determined.

At 213, the expected motor current may be adjusted based on wastegate temperature or other parameters. In some examples, the magnetic field produced by a wastegate actuator motor may be a function of the temperature surrounding the wastegate. For example, the magnetic field may change with changing temperature. If the magnetic field of one of the wastegate actuator motors is different than the magnetic field of the other wastegate actuator motor, the current drawn by each motor may be different and yet the wastegates may still be in the same position. The temperature of the wastegates may be determined based on the exhaust temperature and other parameters, such as flow rate.

If the adjusted motor currents are still different from each other (for example, if the output of the motor current sensor of the first turbocharger is different that the output of the motor current sensor of the second turbocharger by more than 5%), then the motor current difference may be attributed to turbocharger imbalance.

At 214, method 200 determines if wastegate balancing is indicated. Wastegate balancing may be performed if the parameters determined at 208 and 210 above are not equal.

For example, if turbine speed of the first turbocharger is different than turbine speed of the second turbocharger, the wastegates may be adjusted so that the turbine speeds of each turbocharger are brought to a matching speed. In another example, if the wastegate positions are different, the wastegates may be adjusted until they are in the same position. Likewise, if the turbine power of the first turbocharger is different than the turbine power of the second turbocharger, the wastegates may be adjusted so that the turbine powers match. Further, wastegate balancing may be indicated if the sensor output is expected to be the same, but the actual output is different. This may occur when the wastegates are commanded to the same position and/or the sensor outputs are expected to be similar, based on the flow forces and temperature adjustment described above.

If wastegate balancing is not indicated, for example if the sensor output of both turbocharger sensors is equal, method 200 proceeds to 216 to maintain the wastegates in the current positions, and then method 200 returns. If the wastegate balancing is indicated, method 200 proceeds to 218 to further adjust the position of the first wastegate and/or the second wastegate until the parameters of each turbocharger are equal. In one example, if the turbine power of each turbocharger is different, as determined by the motor current of the wastegate actuators, one wastegate may be slightly closed and the other wastegate may be slightly opened, and the turbine power may be monitored until both turbines have equal power. In other example, if the turbine power between the two turbochargers is different, one of the wastegates may be adjusted, while the other wastegate is maintained in the same position. The wastegate of the turbocharger that has the lower turbine power may be adjusted until the turbine power of that turbocharger matches the higher turbine power of the other turbocharger, for example. Other mechanisms of adjusting the wastegates are also possible. Method 200 then returns.

Thus, an indication of turbocharger output, such as turbine speed or turbine power, may be determined for each turbocharger of a twin turbocharger system. If the turbocharger output of each turbocharger is not equal, the wastegates of the turbochargers may be adjusted until the turbochargers reach equal output. The turbocharger output may be determined based on feedback from wastegate sensors, which may measure the motor current of the wastegate actuators, for example.

FIG. 3 is a diagram 300 illustrating various operating parameters during a wastegate adjustment in order to balance two turbochargers. For example, diagram 300 may illustrate various operating parameters during the execution of method 200 of FIG. 2. The first plot from the top in diagram 300 illustrates boost pressure, the second plot from the top illustrates wastegate position (for both a first and second turbocharger wastegate), and the third plot from the top illustrates turbine power, for both turbines of the first and second turbocharger. For each plot depicted in diagram 300, time is illustrated along the horizontal axis and each respective operating parameter is illustrated along the vertical axis.

Referring first to boost pressure, it is illustrated by curve 302. Prior to time t1, boost pressure is low, and the wastegates of each of the turbochargers, illustrated by curves 304 and 306, are open. At time t1, an increase in boost pressure is desired, in response to an accelerator pedal tip-in event for example. To increase boost pressure, the wastegates of each of the turbochargers are commanded to a partially closed position. Thus, after time t1, boost pressure increases.

During the operation with both wastegates open, turbine power is relatively equal between the turbines of the first and second turbochargers, as illustrated by curves 308 and 310.

After the wastegates are commanded to the partially closed position, however, the turbine power of each turbocharger is not equal. For example, the power of the first turbocharger, illustrated by dashed-dot curve 308, may be slightly lower than the turbine power of the second turbocharger, illustrated by solid curve 310.

After it is determined that the turbine power between the two turbochargers is not equal, the wastegates of each turbocharger may be adjusted until the turbine powers match. As shown, after time t2, the first wastegate actuator is adjusted so that the first wastegate position is moved to a more closed position, as illustrated by dashed-dot curve 304. The second wastegate actuator is also adjusted so that the second wastegate position is moved to a more open position, as illustrated by solid curve 306. As a result, after time t2, the turbine power for each of the turbochargers is equal.

In one example, a method for an engine comprises, during select conditions, balancing turbine power of a first turbocharger and a second turbocharger by adjusting a first wastegate actuator of the first turbocharger, the first wastegate actuator adjusted based on motor current of the first wastegate actuator and motor current of a second wastegate actuator of the second turbocharger. The method may further comprise adjusting the wastegate actuator of the first turbocharger and the wastegate actuator of the second turbocharger based on desired boost pressure. The adjusting of the wastegate actuators based on desired boost pressure may be carried out during the select conditions and/or during non-select conditions.

The method may further comprise, during the select conditions, adjusting the second wastegate actuator based on the motor current of the first wastegate actuator and motor current of the second wastegate actuator.

The select conditions may comprise a first wastegate of the first turbocharger and a second wastegate of the second turbocharger being commanded to the same position. The select conditions may comprise the motor current of the first wastegate actuator being different than the motor current of the second wastegate actuator. The select conditions may further comprise expected motor current of the first wastegate actuator being equal to expected motor current of the second wastegate actuator.

As used herein, the term "the same" may include parameters that are exactly equal to each other (such as equal wastegate position) as well as parameters that differ by less than a threshold amount. For example, the wastegate positions may be considered the same if they are within 5% of each other, within one commanded position of each other, etc. Similarly, "different than" may include parameters that are different by more than a threshold amount. For example, the motor currents of the wastegate actuators may be considered different if one motor current is greater than or less than the other motor current by at least 5%.

The motor current of the first wastegate actuator may be based on output from a first wastegate actuator motor current sensor, and the motor current of the second wastegate actuator may be based on output from a second wastegate actuator motor current sensor. The method may further comprise, during non-select conditions, not balancing the turbochargers by maintaining the wastegates in a previously commanded position. The non-select conditions may include conditions other than when the positions of the wastegates are the same, such as when the wastegates are commanded to different positions, and/or when the turbochargers are not imbalanced (e.g., the turbines are operating at the same speed and/or power).

In another example, a method for an engine comprises adjusting a position of a first wastegate of a first turbocharger and a position of a second wastegate of a second turbocharger based on desired boost pressure; and if turbine power of the first turbocharger is different than turbine power of the second turbocharger, then balancing the first and second turbochargers by further adjusting the position of the first wastegate and the second wastegate. The method may further comprise determining the turbine power of the first turbocharger based on output from a first wastegate actuator motor current sensor, and determining the turbine power of the second turbocharger based on output from a second wastegate actuator motor current sensor.

The output of the first wastegate actuator motor current sensor may be proportional to a first force to hold the position of the first wastegate, and the output of the second wastegate actuator motor current sensor may be proportional to a second force to hold the position of the second wastegate. The method may further comprise calculating the turbine power of the first turbocharger based on the first force, and calculating the turbine power of the second turbocharger based on the second force.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system comprising:
a first turbocharger including a first wastegate, first wastegate actuator, and first wastegate actuator motor current sensor;
a second turbocharger including a second wastegate, second wastegate actuator, and second wastegate actuator motor current sensor; and
a controller configured to adjust the first wastegate actuator during select conditions until a parameter of the first turbocharger is equal to a parameter of the second turbocharger, based on output from the first and second wastegate actuator motor current sensors, wherein the select conditions comprise the first wastegate and the second wastegate being commanded to the same position.

2. The engine system of claim 1, wherein the controller includes non-transitory executable instructions to calculate a pressure ratio of a first turbine of the first turbocharger and a pressure ratio of a second turbine of the second turbocharger based on the output from the first and second wastegate actuator motor current sensors.

3. The engine system of claim 2, wherein the controller further includes executable instructions to calculate turbine power of the first turbocharger based on the calculated pressure ratio of the first turbine and calculate turbine power of the second turbocharger based on the calculated pressure ratio of the second turbine.

4. The engine system of claim 3, wherein the controller further includes instructions to adjust the first wastegate actuator and the second wastegate actuator until the turbine power of the first turbocharger matches the turbine power of the second turbocharger.

5. The engine system of claim 1, further comprising an engine having a first cylinder group and a second cylinder group, and wherein the first turbocharger is configured to receive exhaust from the first cylinder group and the second turbocharger is configured to receive exhaust from the second cylinder group.

6. The system of claim 3, wherein the controller further includes executable instructions to determine flow forces acting on the first and second wastegates from at least one sensor signal from at least one sensor disposed in the engine, where the sensor signal includes at least one of mass air flow, manifold air pressure, throttle position, boost pressure, pre-turbine pressure, post-turbine pressure, pre-turbine temperature, post-turbine temperature, and a turbocharger rotational speed signal.

7. The system of claim 6, wherein the executable instructions to determine flow forces comprise a model for determining flow forces.

8. The system of claim 6, wherein the executable instructions to determine flow forces comprise determining flow forces from a pressure differential across the first and second wastegates.

9. The system of claim 6, wherein the executable instructions to determine flow forces comprise determining flow forces acting on the first and second wastegates by generating a lookup table with inputs including wastegate position.

10. The system of claim 6, wherein the controller further includes executable instructions to calculate an expected motor current of the first and second wastegate actuators using determined flow forces.

11. The system of claim 10, wherein the expected motor current is adjusted based on wastegate temperature or other parameters.

12. A method for an engine, comprising:
determining flow forces acting on a first wastegate of a first turbocharger and on a second wastegate of a second turbocharger;
calculating an expected motor current for the first and second wastegates;
adjusting the expected motor current based on wastegate temperature; and
during select conditions, balancing the first turbocharger and the second turbocharger by adjusting a first wastegate actuator of the first turbocharger, the first wastegate actuator adjusted based on motor current of the first wastegate actuator and motor current of a second wastegate actuator of the second turbocharger, wherein the select conditions comprise the motor current of the first wastegate actuator being different than the motor current of the second wastegate actuator.

13. The method of claim 12, further comprising adjusting the wastegate actuator of the first turbocharger and the wastegate actuator of the second turbocharger based on desired boost pressure.

14. The method of claim 12, further comprising, during the select conditions, adjusting the second wastegate actuator based on the motor current of the first wastegate actuator and motor current of the second wastegate actuator.

15. The method of claim 12, wherein the select conditions further comprise expected motor current of the first wastegate actuator being equal to expected motor current of the second wastegate actuator.

16. The method of claim 12, wherein the motor current of the first wastegate actuator is based on output from a first wastegate actuator motor current sensor, and wherein the motor current of the second wastegate actuator is based on output from a second wastegate actuator motor current sensor.

17. A method for an engine, comprising:
adjusting a position of a first wastegate of a first turbocharger and a position of a second wastegate of a second turbocharger based on desired boost pressure;
determining turbine power of the first turbocharger based on output from a first wastegate actuator motor current sensor, and determining turbine power of the second turbocharger based on output from a second wastegate actuator motor current sensor; and
if turbine power of the first turbocharger is different than turbine power of the second turbocharger, then balancing the first and second turbochargers by further adjusting the position of the first wastegate and the second wastegate.

18. The method of claim 17, wherein the output of the first wastegate actuator motor current sensor is proportional to a first force to hold the position of the first wastegate, and wherein the output of the second wastegate actuator motor current sensor is proportional to a second force to hold the position of the second wastegate, and wherein the turbine power of the first turbocharger is calculated based on the first force and the turbine power of the second turbocharger is calculated based on the second force.

\* \* \* \* \*